United States Patent
Ichikawa et al.

(10) Patent No.: US 6,404,352 B1
(45) Date of Patent: Jun. 11, 2002

(54) MOBILE TERMINAL AND EMERGENCY REPORTING SYSTEM

(75) Inventors: Yukio Ichikawa; Akifumi Miyano, both of Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/578,067

(22) Filed: May 24, 2000

(30) Foreign Application Priority Data

May 24, 1999 (JP) .......................................... 11-143187

(51) Int. Cl.⁷ .............................................. G08G 1/123
(52) U.S. Cl. ....................... 340/988; 340/426; 342/457; 701/213
(58) Field of Search .................. 340/426, 988, 340/995, 990, 989, 992, 539, 573.1; 342/457; 701/208, 211, 213

(56) References Cited

U.S. PATENT DOCUMENTS

| 4,651,157 A | * | 3/1987 | Gray et al. ................. 342/457 |
| 5,652,570 A | * | 7/1997 | Lepkofker .................. 340/539 |
| 5,719,771 A | * | 2/1998 | Buck et al. ................ 340/438 |
| 5,808,564 A | | 9/1998 | Simms et al. .............. 340/990 |
| 5,848,373 A | * | 12/1998 | DeLorme et al. ........... 340/990 |
| 6,104,978 A | * | 8/2000 | Harrison et al. ............ 701/207 |

FOREIGN PATENT DOCUMENTS

| DE | 44 21 508 | 12/1994 |
| DE | 43 21 416 | 1/1995 |
| JP | 63-60009 | 3/1988 |
| JP | 06018648 | 1/1994 |

OTHER PUBLICATIONS

European Search Report, application no. 00110286.2 dated Mar. 4, 2002.

* cited by examiner

Primary Examiner—Brent A. Swarthout
(74) Attorney, Agent, or Firm—Ratner & Prestia

(57) ABSTRACT

When a mobile terminal transmits information to an information service centre, the terminal stores positional data of plural points detected by a positional data detector such as a GPS satellite into a memory. The mobile terminal transmits an instant status data, positional data and the terminal ID when an emergency such as an accident, sudden illness occurs. At this time, an appropriate data compression is conducted responsive to a travelling status, such as using relative information, a data-(non-) existing-flag, and a number of points, so that the data volume to be transmitted can be reduced. As a result, the accuracy of positional data is maintained and yet the data transmission time is shortened.

19 Claims, 7 Drawing Sheets

MOBILE TERMINAL AND EMERGENCY REPORTING SYSTEM

FIELD OF THE INVENTION

The present invention relates to a mobile terminal for transmitting emergency information by compressing the information without degrading the details when the emergency should be reported to an information service centre or an emergency centre (hereinafter referred to as a "centre"), and an emergency reporting system for receiving the information at the centre from the mobile terminal and then provides an emergency service from the centre to the mobile terminal.

BACKGROUND OF THE INVENTION

Cellular phones having a position detecting function such as global positioning system (GPS) or movable terminals having a sensor for detecting an abnormality or emergency have been downsized and become inexpensive thanks to technical progresses. Reliability including shockproof characteristic of those mobile terminals has been also improved. Such a mobile terminal in a small body is installed in a vehicle and used as an emergency reporting system when a traffic accident occurs. Another small mobile terminal is shaped into a pendant and used as a man locating system for a user having a chronic illness such as a heart disease to inform a centre of his or her location.

A location sending device as such a mobile terminal is disclosed in Japanese Patent Application Non-Examined Publication No. H06-18648. This location sending device, as shown in FIG. 1, measures a present position using GPS satellite 101, and GPS receiver 102 acquires resultant positional information comprising a latitude, longitude and altitude. This information is measured periodically or at spatial intervals when the mobile terminal moves, and the track information between a plurality of locations is stored in ring-buffer-memory 103 cyclically.

When an abnormality or emergency occurs, or when a centre issues an emergency request, the mobile terminal produces a transmission signal using a given protocol through the following method: a transmission-starting-time supplied from timer 104 and a mobile terminal ID code held by ID-code-holder 105 are added to the track information between plural positions immediately before the instant position. This track information is selected from other track information stored in ring-buffer-memory 103. The transmission signal is formed to have a given signal format at transmission-signal-forming section 107 following a transmission-signal-format provided by transmission-signal-format-holder 106. Radio transmitter 108 modulates a high-frequency-carrier-wave with the transmission signal, and outputs the positional data of a sender from antenna 109 to the centre.

When the centre receives the track information from the mobile terminal, a terminal ID of the centre identifies the sender by checking his membership. At the same time, the track information is plotted on a digital map displayed on a console in the centre, so that the centre can be informed of the track-record of the mobile terminal. When the data transmission from the mobile terminal to the centre is completed, audio signals replace data signals in communication and thus a voice communication between a terminal-owner and the centre takes place.

However, a conventional system takes a rather long time for the communication because all the track information of a mobile terminal including track records between plural points and a terminal ID must be transmitted. In the case of employing a *centre differential GPS method (C-DGPS method), the information about 500 points needs as much as 29 kilo Bytes, and it takes about 30 seconds when the information is sent at 9,600 bps. This time-consuming transmission has been a bottleneck for tracking and searching a mobile terminal. *Centre differential GPS method modifies the information of latitude and longitude acquired by the mobile terminal with error correction, and realises a highly accurate measuring such as a measuring error falling within a 10 to 30 meters range.

In the case of employing a method other than C-DGPS method, the information about 500 points needs approx. 9.5 kilo-Bytes, and it takes about 10 seconds for transmission; however a measuring error becomes as large as several hundreds meters. The centre cannot exactly identify the position of the mobile terminal with this poor positional accuracy.

An emergency reporting system used at a traffic accident or a man-locating system for reporting a heart attack, affects people's lives and thus the system needs a high-speed process as well as highly accurate tracking of the mobile terminal's position. However, the conventional system as discussed above has a problem that the high-speed and high-accuracy are not compatible.

SUMMARY OF THE INVENTION

The present invention addresses the problems discussed above and aims to shorten the communication time by coding data when positional information of plural points is transmitted. Further, the present invention aims to transmit positional data within a short time and with a high accuracy responding flexibly to travelling of a mobile terminal.

The present invention thus concerns an emergency reporting system as defined in the appended claims.

Thanks to these features it is possible to keep a positional accuracy, and this structure can encode the transmission data using relative-information thereby shortening the data transmission time.

An information service centre receives the data sent from the mobile terminal, decodes the data responsive to the compression or coding format of the data received, and supplies various services depending on emergency requests including an accident and a sudden illness. As a result, the centre can supply services within a short time for any compression method.

DETAILED DESCRIPTION OF PREFERRED EMBODIMENT

A preferred embodiment of the present invention is demonstrated hereinafter with reference to the accompanying drawings.

Figure 1:
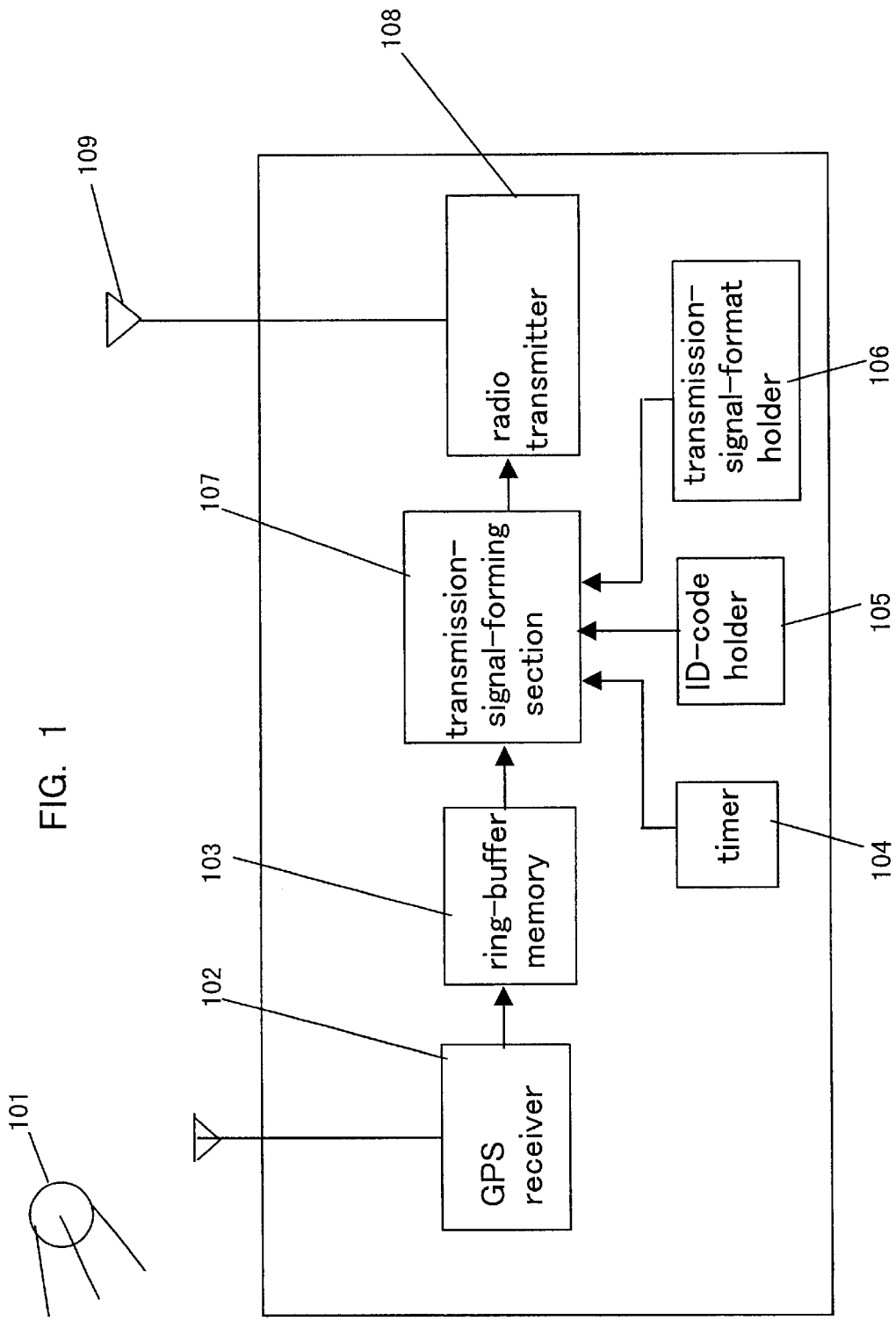
FIG. 1 is a block diagram illustrating a structure of a positional data-transmitter used in a conventional mobile terminal.
Figure 2:
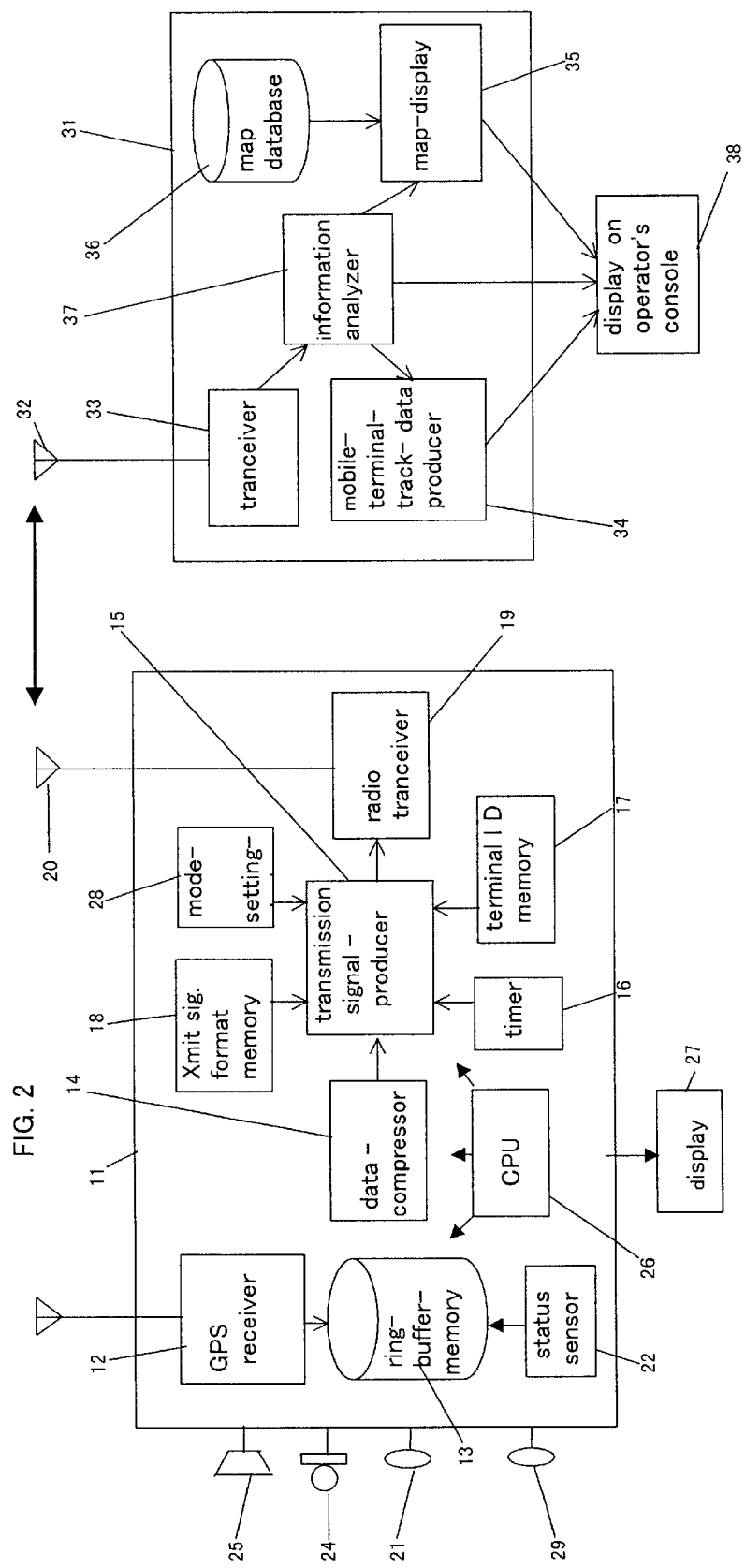
FIG. 2 is a block diagram illustrating structures of a mobile terminal and a centre in accordance with a preferred embodiment of the present invention.

FIG. 2 shows respective structures of a mobile terminal and a centre of the present invention. In FIG. 2, mobile terminal 11 has GPS receiver 12 for detecting positional data. Receiver 12 measures a position of the terminal at given intervals of a distance travelled, given intervals of an elapsed time, given intervals of an angle circled, or intervals of a factor obtained by combining those factors. Resultant positional data is stored cyclically in ring-buffer-memory 13. The data stored in memory 13 includes time-data, latitude and longitude of each location, a distance travelled, and an angle circled. Pseudo distance data between the terminal and respective GPS satellites are also stored in memory 13 because C-DGPS method is employed. The number of the satellites ranges from one to eight, in general.

The positional data acquired by receiver 12 can be compressed or coded first by data-compressor 14, before storing in memory 13. In this case, the capacity of memory 13 can be reduced.

When emergency button 21 is depressed manually in the case of an emergency such as an accident or a sudden illness in order to inform the centre of the emergency personally, the mobile terminal 11 starts an emergency-reporting operation. When status sensor 22 detects automatically an abnormality such as an accident or a sudden illness or when centre 31 requires a report, terminal 11 performs the same. At this time, the data stored in memory 13 about each location is read out, and then sequentially compressed by data-compressor 14. Compressor 14 uses a relative value of the positional data stored in memory 13 or data-flags indicating existence of data for compressing the data. Data compression is detailed later.

The compressed positional data is supplied to transmission-signal-producing device 15. To the compressed positional data, producing device 15 adds time-data obtained from timer 16, a terminal ID of terminal 11 obtained from terminal-ID-memory 17, and emergency information dispatched from emergency button 21 or status sensor 22. Then producing device 15 produces a given transmission signal following a transmission-signal-format provided by format-memory 18. This transmission signal is supplied to radio transceiver 19, and a high-frequency carrier-wave is modulated by transmission signals and transmitted to centre 31 from antenna 20 following a given protocol.

After the transmission, mobile terminal 11 is switched by mode switcher 29 to voice-communication from data-communication, and then terminal 11 functions as a normal cellular phone. Voice-communication between terminal 11 and centre 31 now takes place. This switching can be done automatically by CPU 26.

Operations or respective elements discussed above are controlled by CPU 26. Display 27 shows an operating status of mobile terminal 11 and a notice from centre 31 to a terminal owner.

Centre 31 receives the emergency information, positional data and terminal ID sent by transceiver 33 from mobile terminal 11. Data analyser 37 analyses the data received, identifies membership, and then decodes the compressed positional data. Mobile-terminal-track-data producing device 34 produces track-data of terminal 11 based on the decompressed or decoded positional data. On the other hand, map-display 35 retrieves a target map from map database 36 referring to the decoded positional data. The track-data produced by producing device 34 and the target map retrieved by map-display 35 are supplied to display 38 on an operator's console. Display 38 displays an instant position of mobile terminal 11 together with its track-data on a map on the screen thereof. At the same time, the emergency information and the terminal ID supplied by data analyser 37 are also displayed on display 38.

The operator watches the emergency information, terminal ID, track-data, and instant position of terminal 11 on the screen, and communicates with the terminal owner with voice, so that the operator answers to the emergency appropriately.

Figure 3:
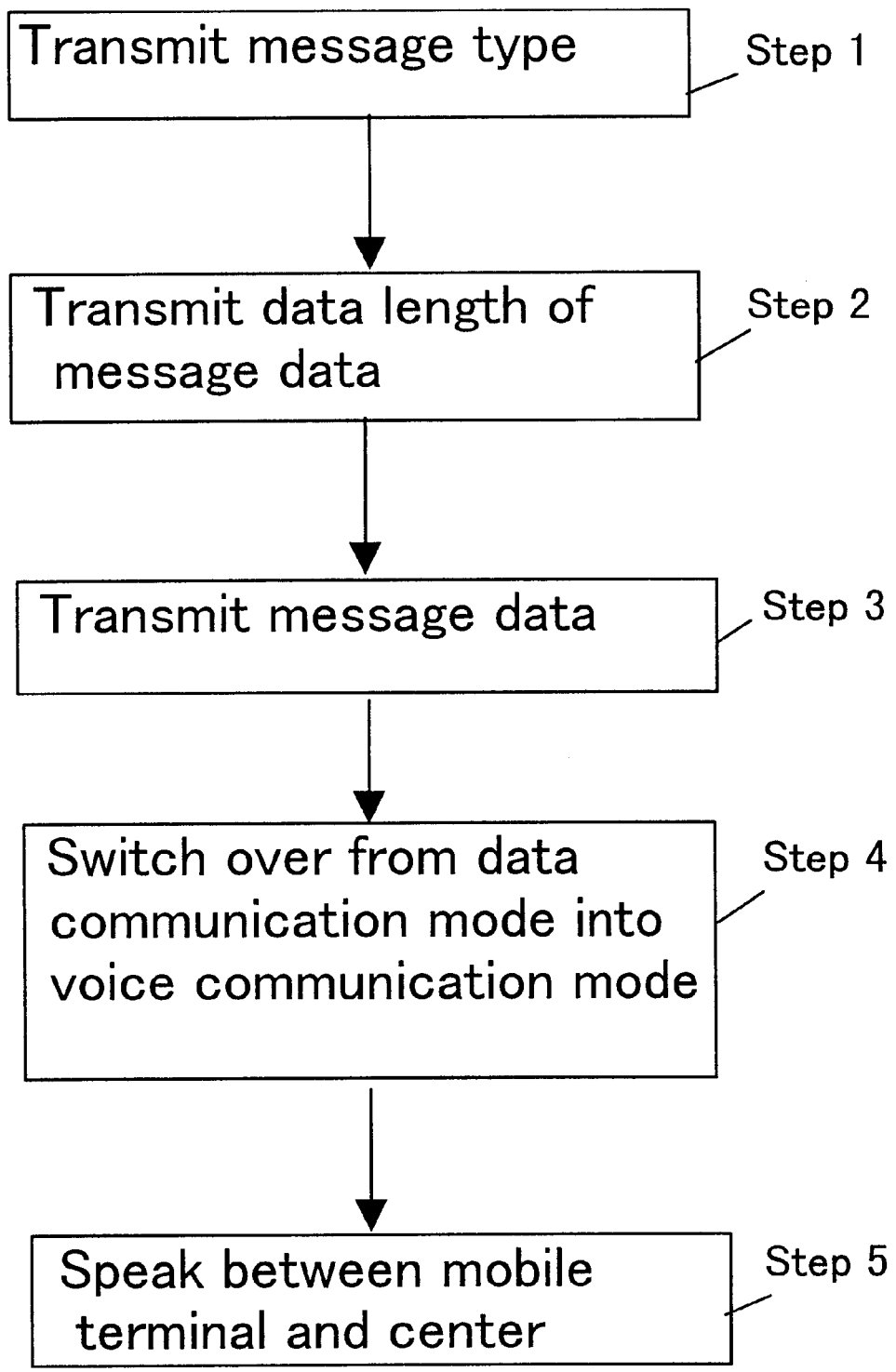
FIG. 3 illustrates a protocol between the mobile terminal and the centre in accordance with the embodiment of the present invention.

FIG. 3 shows a flowchart of the protocol between mobile terminal 11 and centre 31.

Figure 4:
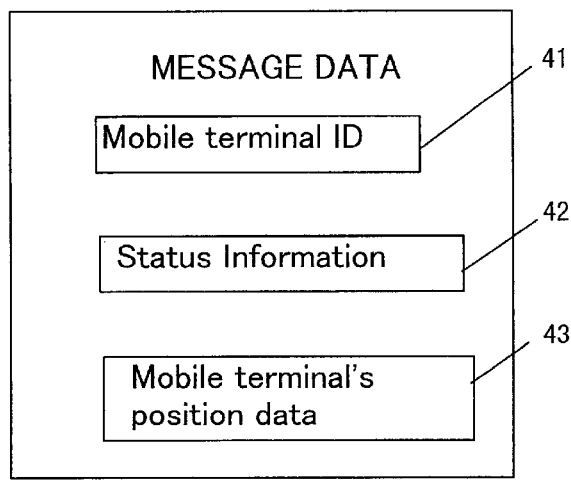
FIG. 4 illustrates a structure of message data in accordance with the embodiment of the present invention.

First, in step 1, message type is transmitted indicating a basic mode or an extension mode. The basic mode transmits a predetermined minimum message required as a transmission message to the centre independent of the will of the mobile terminal's owner. This basic message data includes, e.g. as is shown in FIG. 4, terminal ID 41, status information 42 indicating the content of an emergency, and mobile terminal's positional data 43. Positional data 43 is detailed later. When sensor 22 detects an emergency, the detection is transmitted through the basic mode. On the other hand, the extension mode transmits the data the terminal's owner has set in advance or transmits additionally the data set responsive to a status during the terminal's travel. For instance, the extension mode transmits important data for identifying the position, such as an instant address and a name of a building, as well as a method of travelling (by car, bicycle, train, or on foot). Those data are not obtainable by a GPS receiver 12. When a specified data encoding method is selected and the resultant data is transmitted through the protocol optimised for the compression method, this extension mode is used. In the extension mode, a position can be identified more easily, and the data transmission volume can be reduced. A mobile terminal's owner can set the extension mode with mode-setting device 28.

Next, in step 2, the data length of the message is transmitted. In step 3, the message data per se is transmitted. When the message data is completely transmitted, mobile terminal 11 is switched over to a voice communication mode from a data communication mode in step 4. This switch is conducted when an end-button is depressed at completion of transmitting the message data, or may be automatically conducted after a predetermined period following completion of transmitting the message data. When the terminal is switched over to the voice communication mode in step 4, the terminal owner can start communicating with an operator at centre 31 in step 5 through microphone 24 and speaker 25 equipped to terminal 11.

Figure 5:
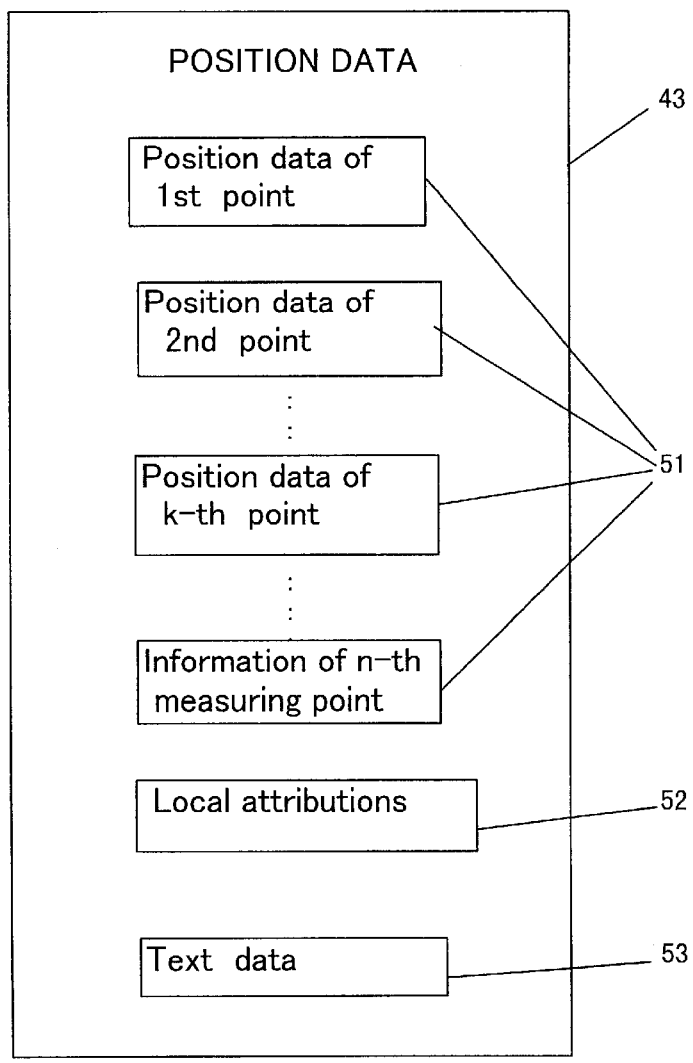
FIG. 5 illustrates a structure of positional data in accordance with the embodiment of the present invention.

FIG. 5 details positional data 43, which contains local positional data of each point the mobile terminal passes through. In other words, positional data 43 comprises point data 51 including first point, second point, . . . k-th point, and local attributions 52 indicating the kind of the local point such as a place name, road, intersection, building, and text data 53. Point data 51 is measured at intervals of a given distance, given period, given circular angle or at intervals obtained by combining these factors. Then "n" pieces of data are cyclically stored in ring-buffer-memory 13. In this context, "cyclically" means that when "n+1"-th data is measured, the oldest data is deleted and the "n+1"-th data is stored in the newest point instead.

Figure 6:
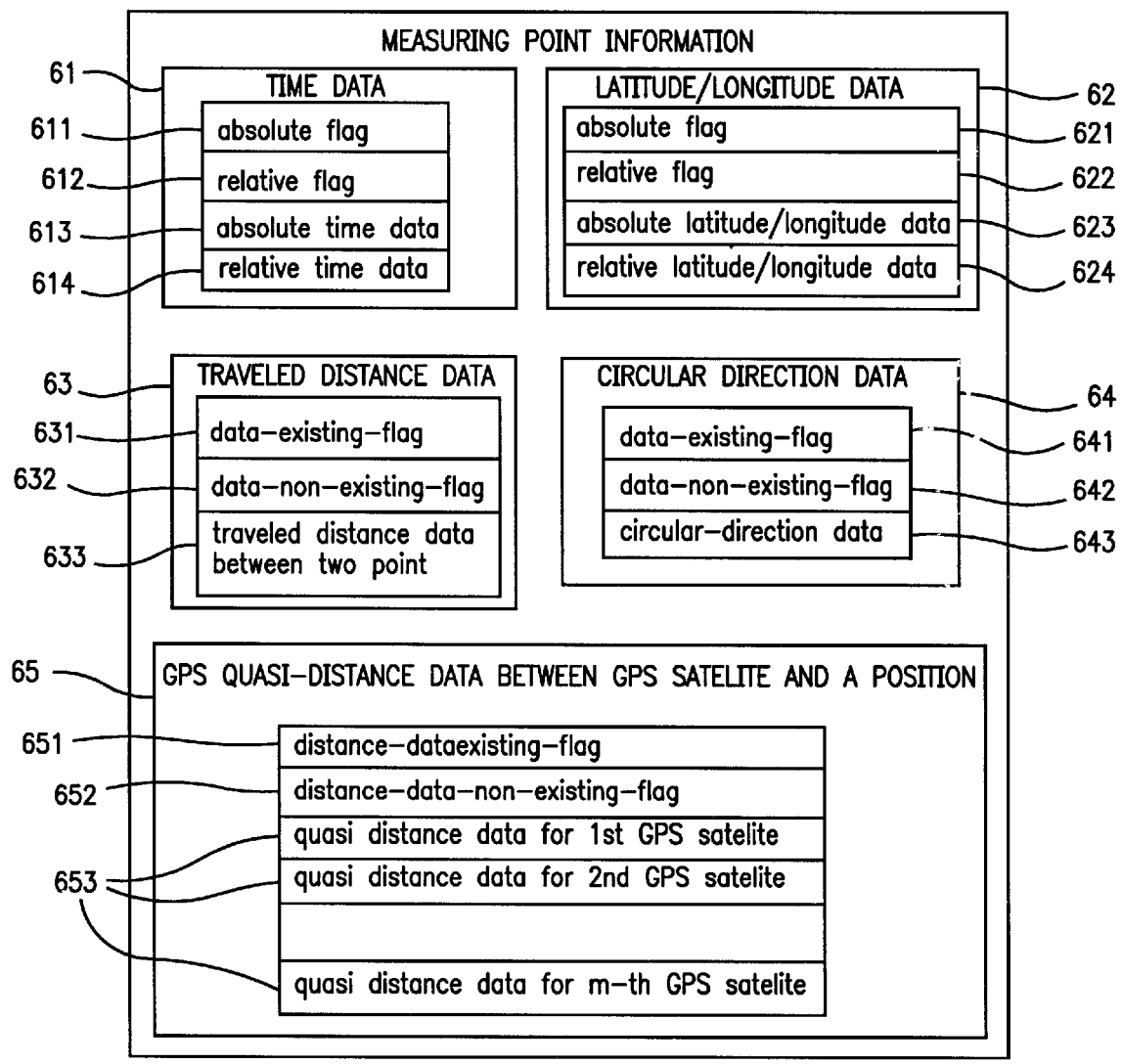
FIG. 6 illustrates a structure of a positional data in accordance with the embodiment of the present invention.

FIG. 6 details the point data, which describes the content of a local point. The point data comprises time data 61, latitude and longitude data 62, travelled distance data 63 between two points, circular direction data 64, and GPS quasi distance data 65 for C-DGPS method.

Regarding time data 61, absolute time data 613 with absolute flag 611 is transmitted at the first point where measuring is started, and then relative time data 614 having relative flag 612 and indicating a time difference with the former point is transmitted at the second point and onward. Using a relative time data in transmission can shorten the transmission time.

Regarding latitude and longitude data 62, absolute data 623 with absolute flag 621 or relative data 624 with relative flag 622 is transmitted. In general, absolute data 623 is transmitted at the first point, and relative data 624 is transmitted at the second point and onward.

Regarding travelled distance data 63 between two points, travelled distance data 633 with data-existing flag 631 or only data-non-existing-flag 632 is transmitted. In general, travelled distance data 633 with data-existing flag 631 is transmitted; however, only data-non-existing-flag 632 is transmitted when no data is obtained or the mobile terminal is halted.

Regarding circular direction data 64, circular-direction data 643 with data-existing flag 641 is transmitted when a circular section travelled through has an angle that is larger than a given angle. In the case of straight travelling without such a circular section, i.e. there thus is no larger angle than the given angle, only data-non-existing-flag 642 is transmitted.

Quasi-distance data 65 comprises distance-data-existing-flag 651, distance-data-non-existing-flag 652 and quasi distance data 653 from respective GPS satellites "1"-"m" to the terminal. In a tunnel or behind a high-rise building, a GPS quasi distance data is not obtainable, and then only distance-data-non-existing-flag 652 is transmitted. This flag-only transmittance can reduce the total transmitted data volume.

The positional data is converted into relative data or into data using a data-existing-flag or a data-non-existing-flag by data-compressor 23 shown in FIG. 2. This conversion contributes to shortening substantially the transmission time.

Figure 7:
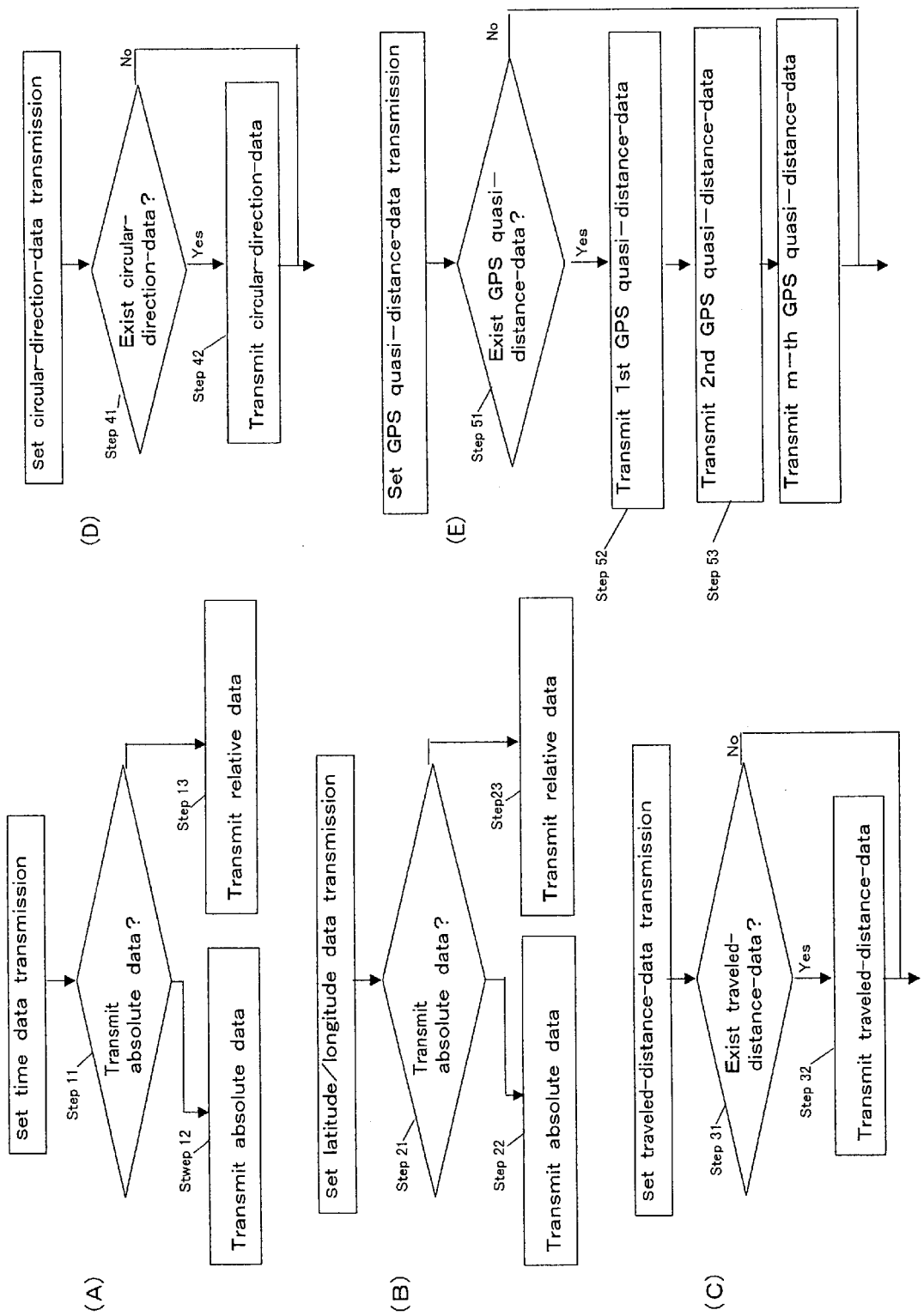
FIG. 7(A) through FIG. 7(E) is a flowchart illustrating a way of transmitting positional data acquired by the mobile terminal in accordance with the embodiment of the present invention.

FIG. 7 is a flowchart illustrating the transmission flow of the point data. FIG. 7, section (A) represents the transmission flow of time data, section (B) represents the transmission flow of latitude and longitude data, section (C) shows that of travelled distance data, section (D) shows that of circular direction data, and section (E) shows that of GPS quasi distance data.

In the time data transmission shown in FIG. 7(A), a decision is made in step 11 whether absolute data is transmitted or not. At the first point, move on to step 12 and then transmit the absolute data; however, on the second point and onward, move on to step 13 and then transmit a changed amount from the first point, i.e. transmit a relative data. If time data☐including year, month, date, hour, minute, and second based on universal time☐is expressed, a total of 32 bits is needed; however, it is reduced to 12 bits if the maximum time difference between each point is set to 4095 seconds (=68 minutes). As a result, if positional data of 500 points should be transmitted, the reduced time data from the second point to the 500th point is 20×499☐8 =1248 Bytes. ☐☐In the rare case where the time difference between each point exceeds 4095 seconds, absolute data instead of relative data is transmitted.

In the latitude and longitude data transmission shown in FIG. 7(B), first a decision is made in step 21 whether or not absolute data is transmitted. This data does not differ so much at each point, thus the absolute data is transmitted at the first point in step 22 and then a changed amount, i.e. the relative data, from the previous point is transmitted at the second point in step 23 and onward. This can reduce the data volume to be transmitted by 13 bits. As a result, the reduced data for sending positional data of 500 points is 13×2×499☐8=1622 Bytes. It rarely happens that the difference between two points exceeds 13 bits (corresponding to 5–7 km in Japan), so that in this case, the absolute data instead of the relative data is transmitted.

In the travelled-distance-data-transmission shown in FIG. 7(C), first a decision is made in step 31 whether or not a travelled distance data exists. If the data exists, move on to step 32 and then transmit a travelled-distance-data with a data-existing flag. If the data does not exist, the flag is turned to non-existing and no data is transmitted.

In the circular-direction-data transmission shown in FIG. 7(D), first a decision is made in step 41 whether or not circular-direction-data exists. When the data exists, move on to step 42 and transmit the circular-direction data with a data-existing flag. When the data does not exist, the flag is turned to data-non-existing and no data is transmitted.

In the quasi distance data transmission shown in FIG. 7(E), a decision is made in step 51 whether or not a GPS quasi-distance-data exists. When the data exists, move on to step 52 and transmit the $1^{st}$ quasi-distance-data from the first GPS satellite with a data-existing-flag, then on step 53, transmit the $2^{nd}$ quasi-distance-data from the second GPS satellite with the data-existing-flag, and repeat the same process for the third, fourth GPS satellites and onward. When the signal from a GPS satellite is not receivable because the instant position is in a tunnel or behind a high-rise building, the flag is turned to data-non-existing and no data is transmitted.

The actual distance from a GPS satellite to a mobile terminal is approximately 20,000 km and this corresponds to "2 cm" in the GPS quasi distance, which requires 30 bits. Only a lower half of this 30 bits, i.e. 16 bits representing a distance ="r" of not more than 1310.72 m (the GPS quasi distance "t" is divided by p=1310.72, and the surplus "r" is obtained), can be transmitted, so that each quasi distance can be compressed to 16 bits from 30 bits. More information is detailed later in FIG. 8. As a result, in the case of transmitting the positional data of 500 points and receiving data from eight satellites, the reduced data volume is 14×8×5000☐8= 7000 Bytes.

Summing up the reduced data volumes discussed previously, the volume can be reduced by a total of approx. 10 Kbytes. Therefore, when a data transmission at 9600 bps is used, approx. 10 seconds can be saved.

Figure 8:
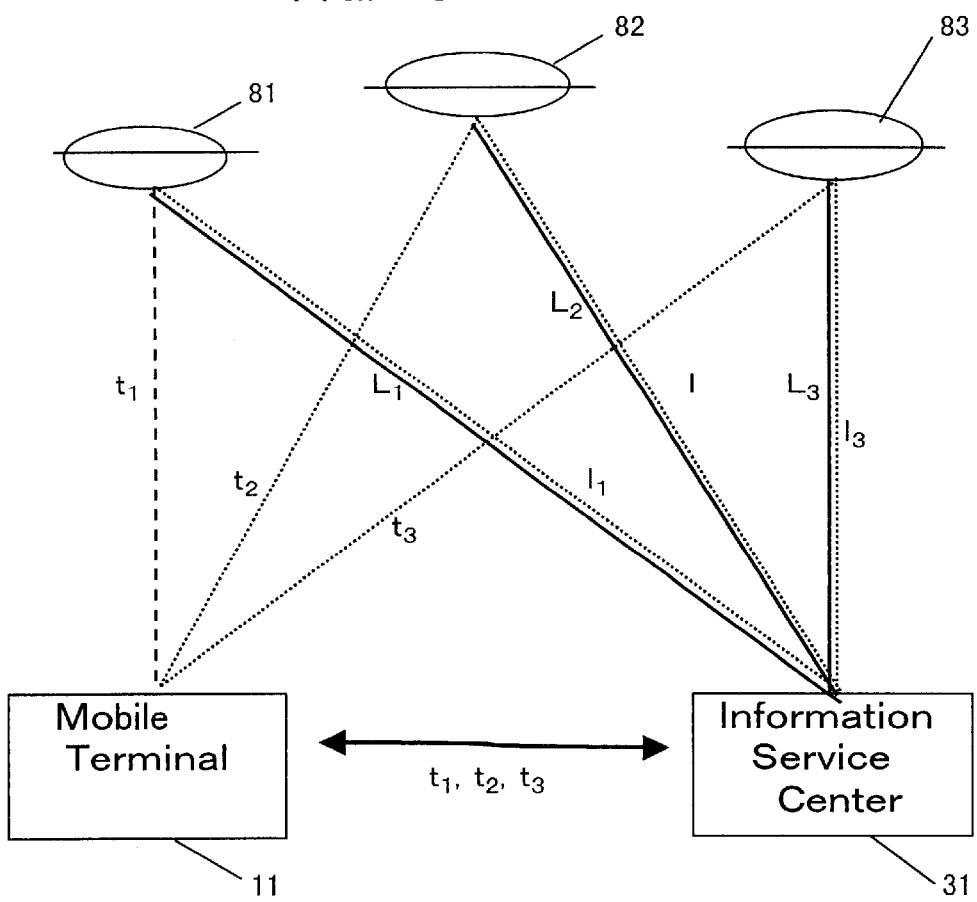
FIG. 8 illustrates a concept of quasi distance correction at the mobile terminal and the centre in accordance with the embodiment of the present invention.

FIG. 8 illustrates correction of a GPS quasi-distance at mobile terminal 11 and centre 31. The GPS quasi-distances have regular errors, thus the error is added to the GPS quasi-distance at the mobile terminal, so that the quasi data is corrected.

The quasi-distance-data is corrected in the following way: Centre 31 is fixed relative to Earth, and its true latitude and longitude are known. True distance $L_1$, $L_2$ and $L_3$ from respective GPS satellites 81, 82 and 83 to centre 31 are found using these true latitude and longitude of centre 31 and respective orbital data of satellites 81, 82 and 83. Then quasi-distances $l_1$, $l_2$ and $l_3$ between respective satellites 81, 82 and 83 to centre 31 are found using the orbital data and centre 31's latitude and longitude acquired by satellites 81, 82 and 83. The differences between those data, i.e. $d_1=L_1\square l_1$, $d_2=L_2\square l_2$, $d_3=L_3\square l_3$, are measuring errors of satellites 81, 82 and 83.

Those measuring errors $d_1$, $d_2$, $d_3$ are added to respective quasi-distances $t_1$, $t_2$, $t_3$ measured by GPS satellites 81, 82 and 83 between mobile terminal 11 and the respective GPS satellites, so that the true latitude and longitude of mobile terminal 11 is acquired.

The way of restoring the compressed GPS quasi-distance is demonstrated hereinafter. As described previously, a lower half 16 bits is transmitted when a GPS quasi-distance is compressed for transmission, i.e. a distance "r" not more than 1310.72 m is transmitted. This is restored in the following way: A rough position "q" of mobile terminal 11 can be found based on latitude and longitude data transmitted from terminal 11 and satellite's orbital data acquired by centre 31. The GPS quasi-distance "t" of terminal 11 is expressed as t=p×q+r, and p=1310.72 is a known value at centre 31, therefore, the transmitted lower half data "r" (16 bits) and "q" can restore the quasi-distance between mobile terminal 11 and the GPS satellite. A measuring error "d" is added to this quasi-distance, so that the correct position of terminal 11 is found.

In the previous discussions, a case where point data is acquired at intervals of given distance, period, circular angle or intervals produced by jot combining those factors is described. In general, when a track of mobile terminal 11 is reproduced, a more accurate position is acquired when using a greater number of points. However, a greater number of points requires a larger volume of data to be transmitted.

When an owner of mobile terminal 11 moves, the owner regularly travels along a road. The possibility of a road circling more than a given angle is rather low. If a road curves more or less, the curves are not a problem to identify the owner's position as far as the owner is known to be on the road. A curve of the road not more than a given angle often falls within the measuring error of GPS receiver 22. Therefore, the detection of a circular angle of not more than a given angle is not needed, and even without this detection, the identification of the position is hardly affected.

For reducing the number of points yet keeping a highly accurate position, when communication terminal 21 moves, the positional data should be acquired only when a circular angle exceeds a given angle. The number of points can be reduced through this method, thus the number of total points as a point attribution is included at the top of transmitting positional data, before being transmitted. This method can reduce the number of points, from which positional data are acquired, compared with the method acquiring positional data at intervals of a given distance or a given period, so that the data volume can be substantially reduced. For instance, when positional data of 500 points are transmitted in order to acquire a travelled track across several kilometres, a conventional system employing the C-DGPS method takes nearly 30 seconds, while the method of the present invention takes only less than 20 seconds.

As discussed above, when positional data of each point is transmitted, the present invention selects an appropriate data compression method such as using a relative data, a quasi-distance-compression, data (non-) existing flag, and the data of a number of points, responsive to a status. This structure can transmit positional data to a centre within a short time yet can remain accurate in identifying the position.

In the demonstrations discussed above, the cases where the C-DGPS method is employed in order to acquire a highly accurate positional data have been demonstrated. When such high accuracy is not needed, the en C-DGPS method is not always employed. In such a case, only relative data are used for time-data, latitude and longitude data. Thus the data amount covering 500 points is reduced from 9.5 Kbytes to 6.6 Kbytes. As a result, the transmission time is shortened to approx. 7 seconds from approx. 10 seconds at 9600 bps.

What is claimed is:

1. A mobile terminal comprising:
   a position data detector for detecting position data corresponding to an absolute position along a traveled path, wherein the position data includes a time data, a latitude and longitude date, a distance data traveled by said terminal, a circular direction data and a global positioning system (GPS) quasi-distance data;
   a memory for storing a plurality of said position data;
   a data compressor for producing compressed relative position data, said relative position data being a change in said absolute position;
   an input device for inputting information indicating an emergency;
   a transmission data producing device for producing a transmission data including said compressed relative position data and a terminal ID; and
   a transceiver for transmitting said compressed relative position data to an information service center.

2. The mobile terminal as defined in claim 1 wherein said data compressor calculates a time difference between an instant time of said terminal and a time at an immediate last point thereof and compresses the time difference.

3. The mobile terminal as defined in claim 1 wherein said data compressor calculates differences of the latitude and longitude data between an instant point of said terminal and at an immediate last point thereof and compresses the differences.

4. The mobile terminal as defined in claim 1 wherein said data compressor calculates a distance difference between an instant point of said terminal and an immediate last point thereof and compresses the difference.

5. The mobile terminal as defined in claim 1 wherein said data compressor compresses the plurality of position data stored in said memory.

6. The mobile terminal as defined in claim 1 wherein said memory stores said compressed relative position data.

7. The mobile terminal as defined in claim 1 wherein said memory stores the plurality of position data cyclically.

8. The mobile terminal as defined in claim 1 wherein said input device is a sensor for detecting automatically an emergency.

9. The mobile terminal as defined in claim 1 wherein said input device is a button operable manually by an owner of said terminal.

10. The mobile terminal as defined in claim 1 wherein the owner of said terminal can set a transmission data and a data compression method arbitrarily in said transmission data producing device.

11. The mobile terminal as defined in claim 1 further comprising a switch for switching a data communication mode to a voice communication mode after the transmission data has been transmitted.

12. A mobile terminal comprising:
   a position data detector for detecting position data corresponding to an absolute position along a traveled path;
   a memory for storing a plurality of said position data;

a data compressor for producing compressed relative position data, said relative position data being a change in said absolute position, wherein said data compressor calculates an angle difference between an instant point of said terminal and an immediate last point thereof and compresses the difference;

an input device for inputting information indicating an emergency;

a transmission data producing device for producing a transmission data including said compressed relative position data and a terminal ID; and a transceiver for transmitting said compressed relative position data to an information service center, wherein said data compressor does not transmit the position data when the circular angle at the point where the data is to be acquired is smaller than a given angle.

13. A mobile terminal comprising:

a position data detector for detecting position data corresponding to an absolute position along a traveled path;

a memory for storing a plurality of said position data;

a data compressor for producing compressed relative position data, said relative position data being a change in said absolute position, wherein said data compressor adds a flag indicating a presence of a distance data traveled, and transmits a data-existing flag and the distance data traveled as a transmission data when the distance data traveled is available, and wherein said data compressor transmits a data-non-existing-flag as a transmission data when no distance data is available;

an input device for inputting information indicating an emergency;

a transmission data producing device for producing a transmission data including said compressed relative position data and a terminal ID; and a transceiver for transmitting said compressed relative position data to an information service center, wherein said data compressor does not transmit the position data when the circular angle at the point where the data is to be acquired is smaller than a given angle.

14. A mobile terminal comprising:

a position data detector for detecting position data corresponding to an absolute position along a traveled path;

a memory for storing a plurality of said position data;

a data compressor for producing compressed relative position data, said relative position data being a change in said absolute position, wherein said data compressor adds a flag indicating a presence of a circling direction data, and transmits a data-existing flag and the circling direction data as a transmission data when the circling direction data is available, and wherein said data compressor transmits a data-non-existing-flag as a transmission data when no circling direction data is available;

an input device for inputting information indicating an emergency;

a transmission data producing device for producing a transmission data including said compressed relative position data and a terminal ID; and a transceiver for transmitting said compressed relative position data to an information service center, wherein said data compressor does not transmit the position data when the circular angle at the point where the data is to be acquired is smaller than a given angle.

15. A mobile terminal comprising:

a position data detector for detecting position data corresponding to an absolute position along a traveled path;

a memory for storing a plurality of said position data;

a data compressor for producing compressed relative position data, said relative position data being a change in said absolute position, wherein said data compressor adds a flag indicating a presence of a GPS quasi distance data, and transmits a data-existing flag and the GPS quasi distance data as a transmission data when the GPS quasi distance data is available, and wherein said data compressor transmits a data-non-existing-flag as a transmission data when no GPS quasi distance data is available, an input device for inputting information indicating an emergency;

a transmission data producing device for producing a transmission data including said compressed relative position data and a terminal ID; and a transceiver for transmitting said compressed relative position data to an information service center, wherein said data compressor does not transmit the position data when the circular angle at the point where the data is to be acquired is smaller than a given angle.

16. A mobile terminal comprising:

a position data detector for detecting position data corresponding to an absolute position along a traveled path;

a memory for storing a plurality of said position data;

a data compressor for producing compressed relative position data, said relative position data being a change in said absolute position, wherein said data compressor compresses a surplus obtained by dividing the GPS quasi-distance data by a value corresponding to a specified distance as the transmission data for compressing data volume;

an input device for inputting information indicating an emergency;

a transmission data producing device for producing a transmission data including said compressed relative position data and a terminal ID; and a transceiver for transmitting said compressed relative position data to an information service center, wherein said data compressor does not transmit the position data when the circular angle at the point where the data is to be acquired is smaller than a given angle.

17. A mobile terminal comprising:

a position data detector for detecting position data corresponding to an absolute position along a traveled path;

a memory for storing a plurality of said position data;

a data compressor for producing compressed relative position data, said relative position data being a change in said absolute position, wherein said data compressor does not transmit the position data when the circular angle at the point where the data is to be acquired is smaller than a given angle;

an input device for inputting information indicating an emergency;

a transmission data producing device for producing a transmission data including said compressed relative position data and a terminal ID; and a transceiver for transmitting said compressed relative position data to an information service center.

18. An information service center comprising:

a receiver for receiving emergency information including a compressed relative position data from a mobile terminal wherein the position data includes a time data, a latitude and longitude date, a distance data traveled by said terminal a circular direction data and a global positioning system (GPS) quasi-distance data;

a decoder for decoding said compressed relative position data;

an acquisition device for acquiring data of a path traveled by the mobile terminal and developing a map corresponding to the compressed relative position data; and a display for displaying the path traveled by the mobile terminal on the map.

19. An emergency reporting system comprising:

a mobile terminal linked with an information service center through radio communication, wherein said mobile terminal transmits a compressed relative positional data including a track traveled by said terminal together with a terminal ID and emergency information, wherein the position data includes a time data, a latitude and longitude date, a distance data traveled by said terminal, a circular direction a data and a global positioning system (GPS) quasi-distance data, wherein said information service center identifies said terminal with the terminal ID received, decodes the compressed relative positional data and displays the track traveled by said terminal on a map indicating an instant position of said terminal, and answers to said terminal about the emergency information.

* * * * *